Patented Sept. 15, 1936

2,054,646

UNITED STATES PATENT OFFICE 2,054,646

MEAT CURING COMPOSITION

Hugh E. Allen, Evanston, Ill.

No Drawing. Application January 21, 1935,
Serial No. 2,753

4 Claims. (Cl. 99—222)

My invention contemplates and provides a novel and superior composition wherewith to cure all kinds of meats.

A principal object of my invention is to provide a curing material which will render the tough ligaments and tendons of meat more tender as a result of their cure.

Another principal object of the invention is to provide a curing material which will make the meats cured thereby firm, and substantially non-elastic, and thereby easily sliced.

Another principal object of the invention is to provide a curing material which insures that the meats cured thereby, when cooked, will be much brighter, particularly in their reddish tints, and thus more attractive and appetizing, than are cooked similar meats cured with any of the curing compositions heretofore known.

I attain the foregoing and other hereinafter mentioned objects and advantages by providing a composition which includes mono-sodium glutamate in combination with sodium chloride and more potent curing salts such as sodium nitrite, sodium nitrate and/or potassium nitrate; the minute particles of the mono-sodium glutamate being "cemented" to, and thereby being retained uniformly admixed with, the particles of the associated salts by an edible adhesive which is preferably in the form of a maple flavor concentrate, but which may be in other forms, such as molasses, corn sirup or raw (unrefined) sugar.

I have found that the particles of mono-sodium glutamate have a remarkable and annoying tendency to "sift" through or "shift" in other particles of solid matter with which they may be intermixed. In the composition of the present invention, however, such sifting or shifting tendency is effectively counteracted and overcome by the edible adhesive to which I have alluded.

Other important and desirable functional characteristics of my novel curing composition, which are largely attributable to its content of evenly distributed mono-sodium glutamate, are:

(a) Fermentation of meat juices is quenched;
(b) The development of mould spores is decidedly retarded; and
(c) The natural characteristic flavor of the cured meat is intensified and enriched.

The maple flavor concentrate, which I prefer to employ as my edible adhesive, is today a well known article of commerce,—being maple sirup from which a substantial part of the normal sugar content has been precipitated with the aid of chemicals, or a centrifuge, or both.

A preferred meat curing composition embodying the present invention includes the following ingredients in substantially the following percentages (by weight), to-wit:

| | Per cent |
|---|---|
| Sodium nitrite | 1 to 5 |
| Sodium nitrate (or potassium nitrate) | 1 to 10 |
| Mono-sodium glutamate | 1 to 10 |
| Edible adhesive in the form of maple flavor concentrate | 1 to 3 |
| Sodium chloride | constituting all or substantially all of the remainder. |

When the edible adhesive is in the form of raw sugars (which are hygroscopic and therefore normally moist and sticky) it should constitute from 10% to 20% of the total weight of the composition. Similarly, when molasses or corn sirup is the edible adhesive, it preferably constitutes from 1% to 5% of the total weight of the composition.

In the manufacture of my curing composition, the sodium chloride, the potent curing salts and the mono-sodium glutamate are thoroughly intermixed in a power driven mixer. The mixer is preferably of the type which functions continuously and violently to move the materials being mixed in different directions toward the center from opposite ends of the container in which the mixing is effected. The mixer also should be of the type permitting additional materials to be added to those in the mixer while the latter operates.

The edible adhesive is then slowly added to the materials previously placed in the mixer, and the operation of the mixer is continued to distribute the said edible adhesive through and over the other ingredients and to "cement" the minute particles of the mono-sodium glutamate to, and in uniform distribution with, its associated salts. My novel curing composition is now ready for packaging, sale, and use.

The curing material of this invention may be utilized in effecting either "dry" or "wet" cures of the meats to which it is applied.

In effecting a "dry" cure, the curing composition is hand-rubbed over the fresh meat pieces to be treated. The meat pieces are then permitted to drain for a number of hours. After draining, the meat pieces are rinsed and again hand-rubbed with the curing composition. A pack, conveniently in a barrel or tub, is next made with the meat pieces under treatment,—a liberal supply of the curing composition being applied to the top layer of the pack. When each piece of meat has remained in the pack its properly allotted time, it is removed from the pack,—washed, dried and then wrapped and/or sacked in the usual manner.

While I prefer to employ my novel curing composition in effecting the "dry" cure by the procedure briefly described in the last preceding paragraph, it should be understood that such composition may be applied to the meat pieces in the form of a brine to effect the so-called "wet" cure.

The composition of the present invention may be used to cure meats which have never been satisfactorily cured with old style curing materials. The latter, generally speaking, have been confined to the treatment of pork, e. g., in the making of ham and bacon. My present composition, however, enables me to produce tender, firm and non-elastic, well-colored and fine flavored chunks of cured beef and veal without corning the same. Lamb, goat and even venison, rabbit and other "game" meats are effectively cured with the material of the present invention. It is also found to be extremely satisfactory in the curing of fish and poultry of all kinds. Regardless of the kind of meat treated, its natural characteristic flavor is intensified and enriched as the result of its cure, and it is made tender, firm and of good appearance.

I much prefer to utilize maple flavor concentrate as my edible adhesive, because it not only performs the function of "cementing" the mono-sodium glutamate to the particles of its associated salts,—it imparts to the taste of the treated meats a delightful and faintly perceptible suggestion of maple without in the slightest degree destroying the desirable natural flavor of the particular variety of meat to which the curing composition is applied.

The formula hereinbefore set forth may, and frequently does, contain condiments in the form of essential oils of spices and oleoresins of peppers,—same preferably being introduced in the form of dry essences of the kind covered by my heretofore granted United States Letters Patent Nos. 1,781,154 and 1,829,431.

The term "potent curing salt" as used in the appended claims, is intended to include either one or more of those salts of the group including sodium nitrite, sodium nitrate and potassium nitrate.

Having thus described my improved meat curing composition and its uses, and the manner of making it, what I claim as new and desire to secure by United States Letters Patent is:

1. A physically uniform meat curing composition in coherent granular form comprising sodium chloride, a salt from the group comprising meat-curing nitrites and nitrates, mono-sodium glutamate, and an edible adhesive coating the granules of the various salts whereby the mono-sodium glutamate is maintained in uniform intermixture with its associated salts.

2. A physically uniform meat curing composition in coherent granular form comprising sodium chloride, a meat-curing nitrite, a meat-curing nitrate, mono-sodium glutamate, and an edible adhesive coating the granules of the various salts whereby the mono-sodium glutamate is maintained in uniform intermixture with its associated salts.

3. A physically uniform meat curing composition in coherent granular form comprising sodium chloride, a meat-curing nitrite, a meat-curing nitrate, mono-sodium glutamate, and an edible, sugary, adhesive flavoring agent coating the granules of the various salts whereby the mono-sodium glutamate is maintained in uniform intermixture with its associated salts.

4. A physically uniform meat curing composition in coherent granular form comprising sodium chloride, a meat-curing nitrite, a meat-curing nitrate, mono-sodium glutamate, and an edible, sugary adhesive flavoring agent in the form of maple flavor concentrate coating the granules of the various salts whereby the mono-sodium glutamate is maintained in uniform intermixture with its associated salts.

HUGH E. ALLEN.